United States Patent
Dejaeger et al.

(10) Patent No.: US 6,731,197 B1
(45) Date of Patent: May 4, 2004

(54) METHODS AND APPARATUS FOR PROVIDING DISPLAY OF BAGGING INDICATOR ON ELECTRONIC PRICE LABELS

(75) Inventors: Wilfried Elie Yves Dejaeger, Keerbergen (BE); John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 681 days.

(21) Appl. No.: 09/612,043

(22) Filed: Jul. 7, 2000

(51) Int. Cl.[7] .............................................. G05B 19/00
(52) U.S. Cl. ......................... 340/5.91; 705/20; 235/383
(58) Field of Search ................................. 235/383, 375; 705/14, 16, 20, 23; 349/142; 340/5.91, 5.64, 5.61, 10.1; 345/2.1, 2.2, 2.3

(56) References Cited

U.S. PATENT DOCUMENTS 5,771,005 A * 6/1998 Goodwin, III ............. 340/5.91
5,847,378 A * 12/1998 Goodwin, III ............. 235/383

* cited by examiner

Primary Examiner—Andrew J. Fischer
(74) Attorney, Agent, or Firm—Priest & Goldstein, PLLC; Paul W. Martin

(57) ABSTRACT

Techniques for cost effectively displaying a bagging indicator by an electronic price label (EPL) are described. An EPL computer reads an EPL data file to determine if an item contains a bagging indicator. The EPL computer transmits a message to an EPL associated with the item which includes a command for the EPL to display a bagging indicator. The EPL then displays the bagging indicator, providing valuable information to customers who are in the process of making purchasing decisions. In one aspect, one or more colored areas on a face plate of the EPL are formed by silkscreening. An EPL liquid crystal segment shaped substantially similar to the colored area is aligned behind each of the colored areas. When the EPL segment behind a colored area is not active, the color is visible to customers, providing the bagging indicator.

12 Claims, 5 Drawing Sheets

METHODS AND APPARATUS FOR PROVIDING DISPLAY OF BAGGING INDICATOR ON ELECTRONIC PRICE LABELS

FIELD OF THE INVENTION

The present invention relates generally to improvements in electronic price label (EPL) systems used in transaction establishments. More specifically, the present invention relates to improvements in EPL systems including systems and methods for an EPL to display a bagging indicator which indicates where an item associated with the EPL should be placed in a customer's shopping container.

BACKGROUND OF THE INVENTION

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server where information about the EPLs is typically maintained in an EPL data file which contains EPL identification information and EPL merchandise item information. The central server sends messages, including price change messages, to the EPLs.

Consumers and governments are becoming more conscious of health concerns relating to purchased food items. Currently, consumers typically browse through a retail establishment, select certain items and place the items to be purchased in a shopping container, such as a shopping cart, a shopping basket or a shopping bag. When disparate items are placed in a common shopping container, contamination from one item may potentially be spread to another item. For example, packaged raw meat may leak a fluid containing salmonella onto fresh produce or onto the surface of a clean can. Governments are beginning to respond to this problem by requiring that certain items be kept in separate shopping containers or in an approved shopping container which includes multiple compartments. Consumers need to know or may profit from a reminder as to which items should be placed into a particular shopping bag or compartment.

Therefore, it would be desirable to provide EPL systems and methods which include an EPL that displays a bagging indicator which indicates where an item associated with the EPL should be placed in a customer's shopping container.

SUMMARY OF THE INVENTION

The present invention advantageously provides methods and apparatus for displaying a bagging indicator by an EPL to provide shopping information to customers. The bagging indicator may suitably indicate a product type of the item, informing customers of which compartment or shopping bag the item should be placed into. According to one aspect of the present invention, an EPL computer reads an EPL data file to determine if an item has an associated bagging indicator. The EPL computer transmits a bagging message to an EPL associated with the item which includes a command for the EPL to display a bagging indicator. The EPL then displays the bagging indicator providing valuable information to customers who are in the process of selecting items.

In one aspect, the present invention advantageously allows a retailer to make the consumer aware that certain items need to be grouped in a particular compartment or bag when selected for purchase. In a preferred embodiment, a bagging indicator displayed by an EPL may comprise a color which indicates the categorization of an item. For example, a first color may correspond to items which potentially include a risk of salmonella contamination, a second color may indicate that an item is a produce item and must be placed in a separate plastic bag, and a third color may indicate that an item includes a sealed container which prevents the spread of any contamination. Customers may advantageously use the bagging indicator to place items with like colors in the same compartment or bag.

In the preferred embodiment, the present invention provides for the display of a colored bagging indicator by an EPL by silkscreening, or otherwise imprinting, one or more colored areas on a face plate of the EPL. An EPL segment shaped substantially similar to the colored area is aligned behind each of the colored areas. When the EPL segment behind a colored area is not active, the color is visible to customers. Conversely, when the EPL segment behind a colored area is active, the color is not visible to customers.

In another aspect, the bagging indicator is displayed by an EPL as a number. The number may suitably correspond to one compartment of a shopping bag or to a particular type of shopping bag.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
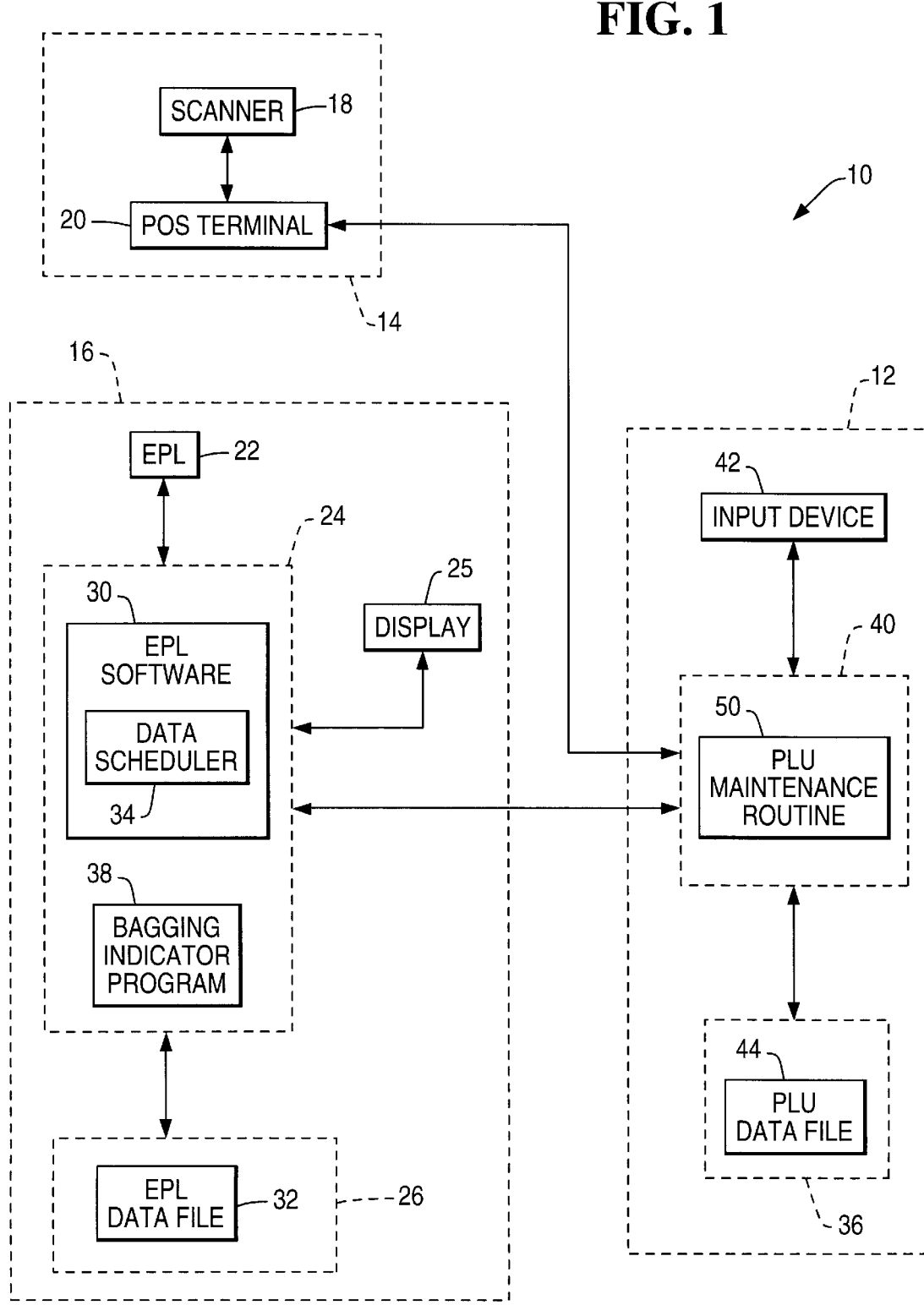
FIG. 1 is a block diagram of a transaction management system, including an EPL system in accordance with the present invention.

FIG. 1 shows a transaction management system 10 which includes a host computer system 12, a point-of-service (POS) system 14, and an EPL system 16. Here, components 12, 14, and 16 are shown as separate components that are networked together, but they and their subcomponents may also be combined in various ways. Thus, host computer system 12 may be a POS terminal which doubles as a host computer for a network of other POS terminals.

The host computer system 12 includes a storage medium 36, a host price look-up (PLU) terminal 40, and an input device 42. The storage medium 36 includes a PLU data file 44 which stores item prices which are available for distribution to a POS terminal 20 by the host PLU terminal 40. Alternatively, provision may be made for a bar code scanner 18 to directly access the PLU data file 44. Host PLU terminal 40 executes PLU maintenance routine 50 which updates PLU data file 44. Input device 42 is preferably a keyboard, but it will be recognized that data can be entered in a variety of alternative manners.

POS system 14 includes bar code scanner 18 and terminal 20.

EPL system 16 primarily includes EPLs 22, host EPL terminal 24, EPL storage medium 26, and display 25. EPLs are typically attached to store shelving adjacent to items.

Terminals 20, 24, and 40 are shown as separate components that are networked together, but they may also be combined in different ways. For example, EPL terminal 24 and host PLU terminal may be combined to form a single host computer. POS terminal 20 and host PLU terminal may be combined to form a POS terminal which doubles as a host computer for a network of other POS terminals.

Host EPL terminal 24 executes EPL software 30, which maintains the contents of EPL data file 32. Host EPL terminal 24 also executes bagging indicator program 38, described in further detail below. In an alternative embodiment, bagging indicator program 38 may be combined with EPL software 30.

EPL software 30 records, schedules, and transmits all messages to EPLs 22. EPL software 30 also maintains and uses EPL data file 32, which contains item information, such as a PLU number and EPL identification information for each of the EPLs 22. EPL software 30 includes data scheduler 34 which schedules messages to EPLs 22.

Figure 2:
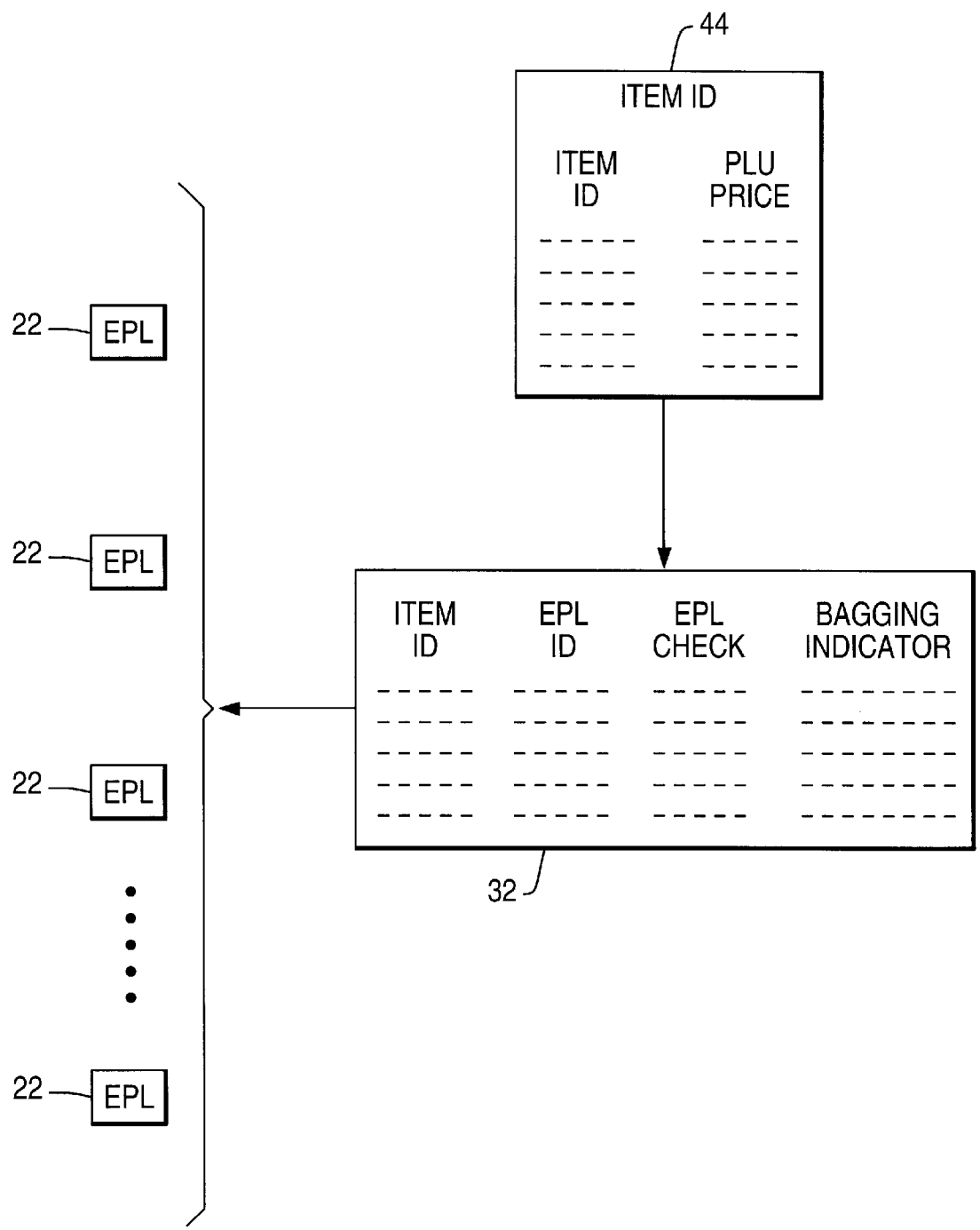
FIG. 2 is a block diagram showing data files used within a transaction establishment in accordance with the present invention.

Turning now to FIG. 2, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), entry price checksum (EPL CHECK) and a bagging indicator (BAGGING INDICATOR) entry. Entry ITEM ID identifies a store item. Entry EPL ID identifies which EPL is assigned to the item. Entry price checksum (EPL CHECK) is calculated from the price in PLU data file 44. Entry BAGGING INDICATOR identifies which, if any, bagging indicator is to be displayed by the EPL assigned to the item.

While in a presently preferred embodiment BAGGING INDICATOR is maintained in EPL data file 32, BAGGING INDICATOR may also be maintained in a separate file.

PLU data file includes a line entry for each item sold in the store. Each line entry has an item identification entry (ITEM ID) identifying a store item, and a PLU price entry (PLU PRICE) identifying the price read by POS system 14 to determine the price of each item during scanning by bar code scanner 18.

During normal operation, EPL software 30 obtains price information for an item from PLU data file 44. Data scheduler 34 schedules price change messages for transmission to EPLs. EPL software 30 controls transmission of messages to the EPLs.

In order to provide a customer with color coded or numerical bagging information, bagging indicator program 38 reads EPL data file 32 to determine if an item has a BAGGING INDICATOR entry. If the BAGGING INDICA-TOR entry indicates that a bagging indicator is to be displayed by the EPL assigned to the item, the bagging indicator program 38 causes EPL software 30 to transmit a bagging indication message to the EPL 22 associated with the item. The bagging indication message instructs the EPL to display a bagging indicator which may suitably comprise a colored area or a numerical indicator, for example, as described below.

Figure 3:
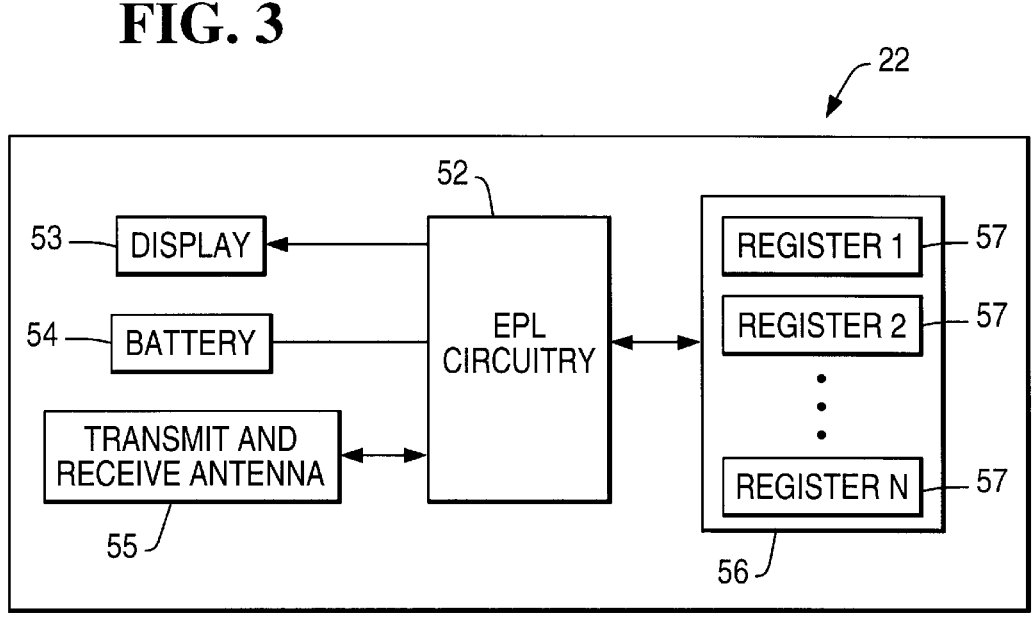
FIG. 3 is a block diagram of an EPL in accordance with the present invention.

FIG. 3 shows a block diagram of an EPL 22 in accordance with the present invention. The EPL 22 includes EPL circuitry 52, a display 53, a battery 54, a transmit and receive antenna 55 and a memory device 56. The memory device 56 includes a plurality of registers 57 which store price, promotional and other types of information to be displayed by the EPL 22. In one aspect, when a bagging indication message is received by the EPL 22, an entry is made in one of the registers 57, causing the EPL circuitry 52 to display a bagging indicator by activating, or turning on, liquid crystal segments, described below, aligned behind colors which are not to be displayed. By leaving the segment inactive, or turned off, behind a color to be displayed, this color is visible to customers on the display 53. The default setting for EPL circuitry 52 is for the display of no colors until a bagging indication message is received.

In another aspect, when a bagging indication message is received by the EPL 22, an entry is made in one of the registers 57, causing the EPL circuitry 52 to activate a display of a numerical indicator corresponding to a particular compartment or a particular bag into which the item should be placed.

Figure 4B:
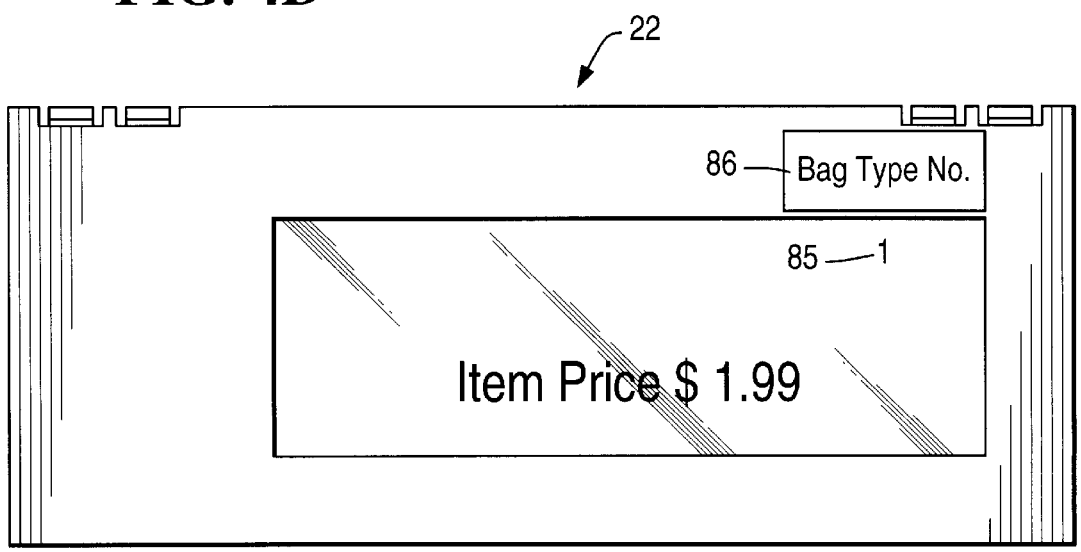
FIG. 4B is a frontal view of an EPL displaying a bagging indicator in accordance with another aspect of the present invention.
Figure 4A:
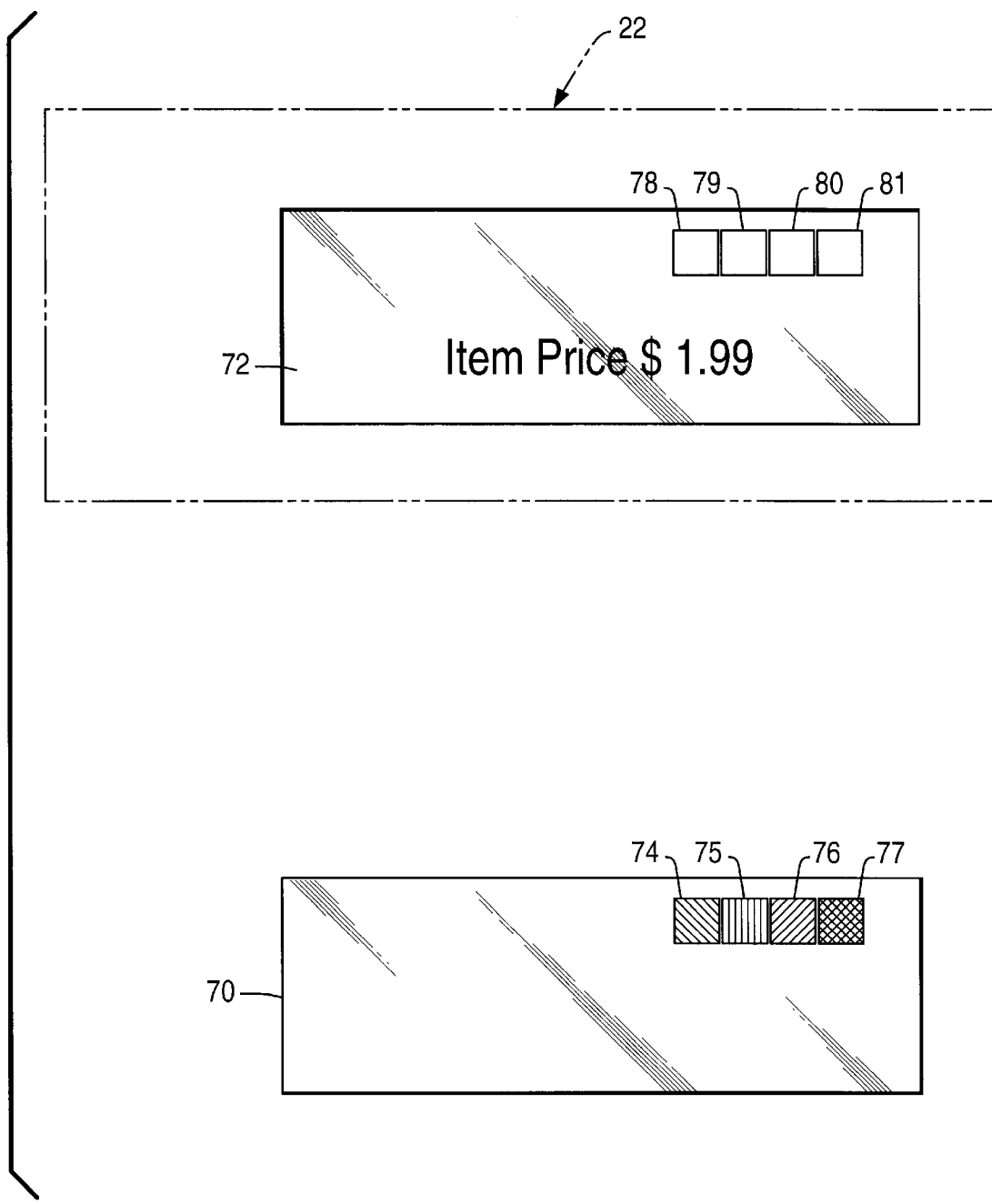
FIG. 4A is a frontal view of an EPL face plate and a liquid crystal display for displaying a bagging indicator in accordance with one aspect of the present invention.

FIG. 4A shows a frontal exploded view of an EPL 22 which includes an EPL face plate 70 and an EPL liquid crystal display 72 in accordance with one aspect of the present invention. The face plate 70 is adapted to cover EPL display 72 while the EPL 22 is in operation and includes one or more colored areas 74, 75, 76, 77 which have been applied to the surface of the face plate 70 using silkscreening or some other suitable method. Each colored area 74–77 may suitably have a different color, such as, for example, red, green, yellow or blue. The EPL display 72 includes one or more individually addressable liquid crystal segments 78, 79, 80, 81 which are shaped substantially similar to the colored areas 74–77. The segments 78–81 are positioned such that when the face plate 70 is placed adjacent to a front surface of the display 72, each colored area 74–77 is in substantial alignment with a corresponding liquid crystal segment 78–81, respectively. As described above, a color is displayed by turning off, or deactivating, the segments 78–81 aligned behind the color to be displayed. While the present invention is being shown with the colored areas 74–77 and segments 78–81 being of a generally square shape, any suitable shape may be utilized, such as, for example, a circle, a triangle or a custom shape.

FIG. 4B shows a frontal view of an EPL 22 displaying a bagging indicator 85 in the form of an exemplary text message "I" in conjunction with a paper overlay 86 reading "Bag Type No."

In one aspect, the present invention advantageously allows a retailer to make the consumer aware of that certain items need to be grouped in a particular compartment or bag when selected for purchase. In a preferred embodiment, a bagging indicator displayed by an EPL may comprise a color which indicates the categorization of an item. For example, a first color, such as red, may correspond to items which potentially include a risk of salmonella contamination, a second color, such as green, may indicate that an item is a produce item and must be placed in a separated plastic bag, and a third color, such as blue, may indicate that an item is packaged in a sealed container which prevents the spread of any contamination. Customers may advantageously use the bagging indicator to place items with like colors in the same compartment or bag.

Figure 5:
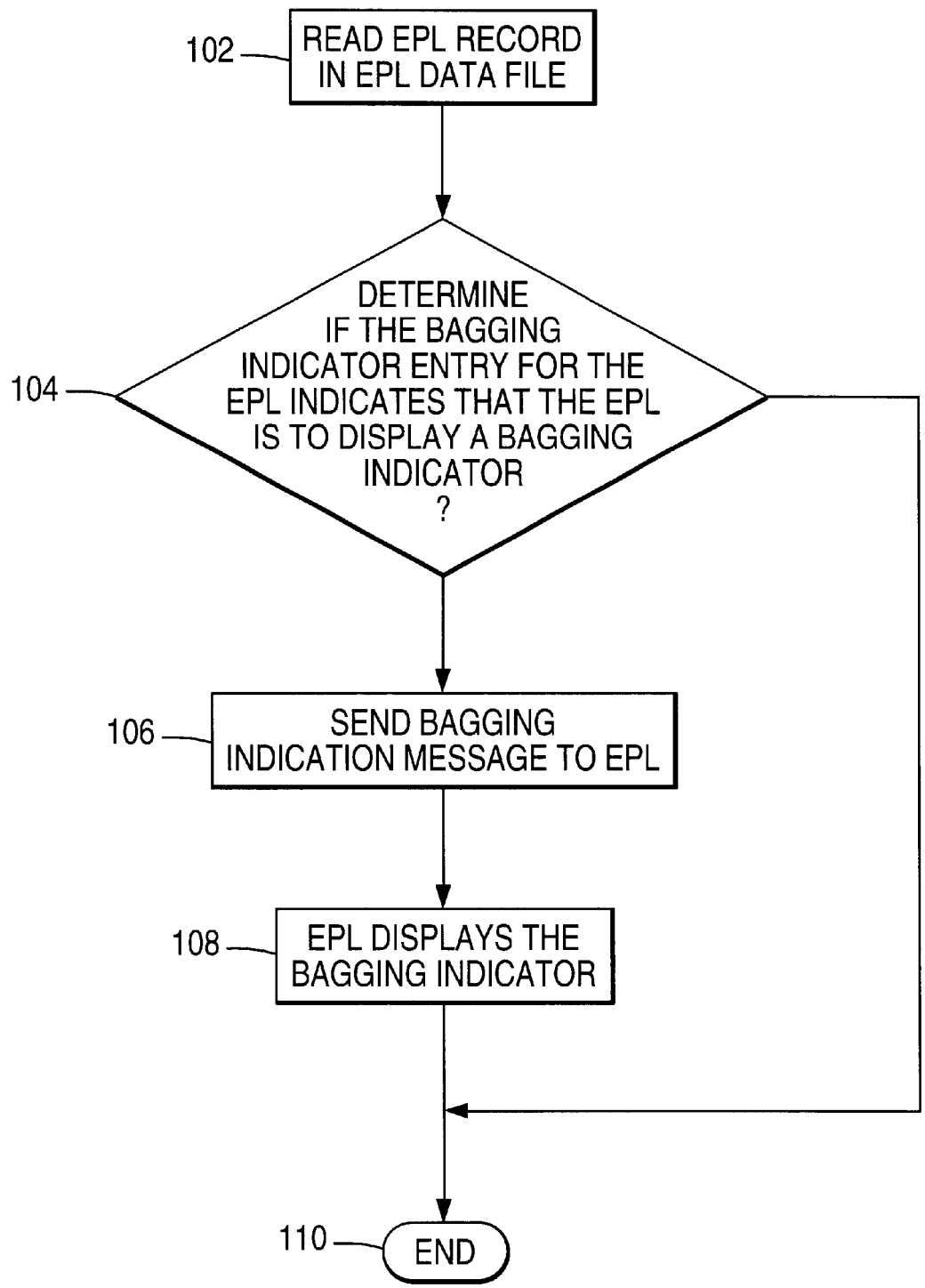
FIG. 5 shows a method of displaying a bagging indicator by an EPL in accordance with the present invention.

FIG. 5 shows a method 100 of displaying a bagging indicator by an EPL in accordance with the present invention. In step 102, a bagging indicator program reads an EPL record associated with an item in an EPL data file. In step 104, the bagging indicator program determines if a BAGGING INDICATOR entry in the EPL record indicates that the EPL should display a bagging indicator. If the BAGGING INDICATOR entry indicates that the EPL associated with the item should not display a bagging indicator, the method proceeds to step 110 and ends. If the BAGGING INDICATOR entry indicates that the EPL should display a bagging indicator, such as a colored area, then the method moves to step 106 and the bagging indicator program sends a bagging indication message to the EPL. In step 108, the EPL deactivates, or turns off, a liquid crystal segment aligned behind the colored area to be displayed, allowing the color to be visible to customers. Alternatively, a number such as "1", "2" or "3" beside the text "Bag Type No." is displayed. The method continues to step 110 and ends.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. An electronic price label (EPL) comprising:
 a display for displaying information in response to a message transmitted from an EPL computer, said information including a bagging indicator which indicates where an item associated with the EPL should be placed in a shopping container;
 wherein the display includes
  a liquid crystal display including a plurality of addressable segments having predetermined shapes;
  a face plate disposed on a front surface of the liquid crystal display, the face plate including a plurality of colored areas having substantially said predetermined shapes, each of the plurality of colored areas disposed substantially in alignment with one of said addressable segments;
  circuitry for controlling the state of the addressable segments;
  an antenna for receiving the message; and
  circuitry for controlling the display;
  wherein the bagging indicator includes at least one of the colored areas of the display.

2. The electronic price label of claim 1 wherein:
 when one of the plurality of addressable segments is deactivated, a color of the colored area aligned with said one of the plurality of addressable segments is substantially visible; and
 when said one of the plurality of addressable segment is activated, the color of the colored area aligned with said one of the plurality of addressable segments is not substantially visible.

3. The electronic price label of claim 2 wherein:
 the colored areas comprise a plurality of colors.

4. The electronic price label of claim 3 wherein:
 a first of the plurality of colors indicates that the item is an uncooked meat product.

5. The electronic price label of claim 4 wherein:
 a second of the plurality of colors indicates that the item is an uncooked produce product.

6. The electronic price label of claim 1 wherein the display of the bagging indicator indicates the item associated with the EPL poses a contamination risk.

7. The electronic price label of claim 1 wherein the bagging indicator indicates a compartment of the shopping container which should be used to carry the item.

8. An electronic price label (EPL) system comprising:
 an EPL computer; and
 an EPL which receives a message from the EPL computer containing a command for the EPL to display a bagging indicator, which indicates where an item associated with the EPL should be placed in a shopping container;
 wherein the EPL includes
  a liquid crystal display for displaying the bagging indicator including a plurality of addressable segments having predetermined shapes;
  a face plate disposed on a front surface of the liquid crystal display, the face plate including a plurality of colored areas having substantially said predetermined shapes, each of the plurality of colored areas disposed substantially in alignment with one of said addressable segments;
  circuitry for controlling the state of the addressable segments;
  an antenna for receiving the message; and
  circuitry for controlling the display;
  wherein the bagging indicator includes at least one of the colored areas of the display.

9. The EPL system of claim 8 wherein the EPL is further for displaying a current price of an item.

10. The EPL system of claim 8 wherein the EPL computer further comprises an EPL data file which includes a bagging indicator entry.

11. A method of displaying a bagging indicator by an electronic price label (EPL), the bagging indicator indicating where an item should be placed in a shopping container, the method comprising the steps of:
 reading a record associated with the EPL to determine if the EPL is to display the bagging indicator;
 sending a bagging indicator message to the EPL including a command for the EPL to display the bagging indicator; and
 activating a number of addressable segments of a liquid crystal display of the EPL which are substantially aligned with colored areas of a face plate disposed on a front surface of the liquid crystal display by the EPL to display the bagging indicator.

12. The method of claim 11 further comprising the steps of:
 displaying by the EPL a price of an item associated with the EPL.

* * * * *